M. M. LEWIS.
Hose-Coupling.
No. 167,262.                    Patented Aug. 31, 1875.
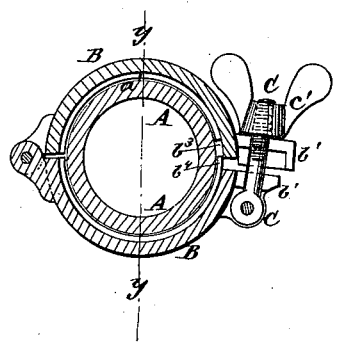
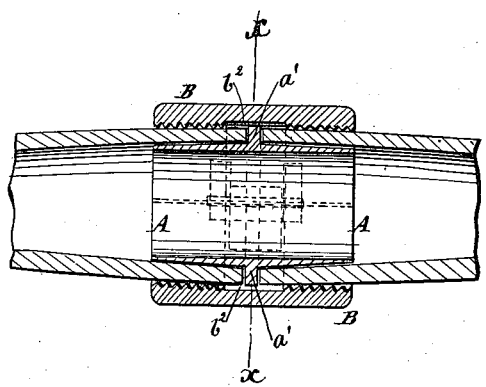

UNITED STATES PATENT OFFICE.

MARK M. LEWIS, OF NEW YORK, N. Y., ASSIGNOR TO HIMSELF AND ALBERT C. AUBERY, OF SAME PLACE.

IMPROVEMENT IN HOSE-COUPLINGS.

Specification forming part of Letters Patent No. 167,262, dated August 31, 1875; application filed July 31, 1875.

*To all whom it may concern:*

Be it known that I, MARK M. LEWIS, of the city, county, and State of New York, have invented a new and useful Improvement in Hose-Coupling, of which the following is a specification:

Figure 1 is a detail cross-section of my improved hose-coupling, taken through the line $x\ x$, Fig. 2. Fig. 2 is a detail longitudinal section of the same, taken through the line $y\ y$, Fig. 1.

Similar letters of reference indicate corresponding parts.

The invention will first be described in connection with drawing, and then pointed out in the claim.

A is the inner part of the coupling, which is made in tubular form, and has a ring-rib, $a'$, formed around its center, which rib should be a little higher than the thickness of the hose. The tube A is made of such a size that it may fit into the cavity of the hose. B is the outer part of the coupling, which is made in two semi-cylindrical parts or halves, which are hinged to each other at one edge, and have flanges $b^1$ formed upon their other edges. One of the flanges $b^1$ may be made a little larger than the other, and may be recessed upon its forward side, to receive the said other flange. The middle part of the flanges $b^1$ are notched transversely, to receive the bolt C, which is hinged to one of the halves B at the rear side of its flange $b^1$, so that it may be swung down into the notches of the flanges $b^1$ in fastening the coupling, and swung up in unfastening it. Upon the end of the bolt C is cut a screw-thread, to receive a hand-nut, $c'$, so that by screwing up the said nut the flanges $b^1$ of the parts B may be drawn closer together, drawing the halves of the said part B snugly upon the hose, and thus clamping it securely. Upon the inner surface of the end parts of the halves B is cut a screw-thread, which sinks into the outer surface of the hose, and thus clamps the said hose more securely. These screw-threads also enable the coupling to be used for connecting the hose to the engine, if required. In the middle part of the inner surface of the halves B is formed a ring groove, $b^2$, to receive the rib $a'$ of the inner part or tube A, as shown in Fig. 2. The ring-rib $a'$ and ring-groove $b^2$ prevent the parts of the coupling from slipping upon each other when coupling the hose, and also prevent the said parts from becoming separated when not in use, and when being carried. Upon the inner corner of the forward edge of one of the halves B is formed a rabbet, $b^3$, and upon the inner corner of the forward edge of the other half is formed a flange, $b^4$, fitting into the said rabbet, so that the coupling may clamp the hose and hold it securely and without leakage should it be too thick for the halves B to shut closely upon it. This construction enables the outer hinged part B to be used without the inner tube A in circumstances where it would be inconvenient to cut the hose to enable said inner tube to be inserted—as, for instance, when a hose bursts which has been passed up the side of a building, and which could not be cut without being lowered to the ground. In this case the hand-nut $c'$ is run out to the extreme end of the hinged bolt C, a ladder is raised, and a fireman ascends and clasps the said outer part B about the part of the hose where the leak is, and screws up the nut $c'$, the rabbet $b^3$ and flange $b^4$ enabling this to be done, while the hose is extended by the water. The part B will remain in place so long as the hose is kept filled with water. When the water is allowed to run out and the hose is lowered the hose may be cut and the coupling applied in the usual way.

Having thus described my invention, I claim as new and desire to secure by Letters Patent—

The hinged two-part tubular coupling B, provided with flanges $b^1\ b^4$, groove $b^2$, and rabbet $b^3$, as shown and described, to enable it to be used independently, or with a middle-ribbed inner coupling, as set forth.

MARK M. LEWIS.

Witnesses:
 JAMES T. GRAHAM,
 ALEX. F. ROBERTS.